Patented Feb. 3, 1931

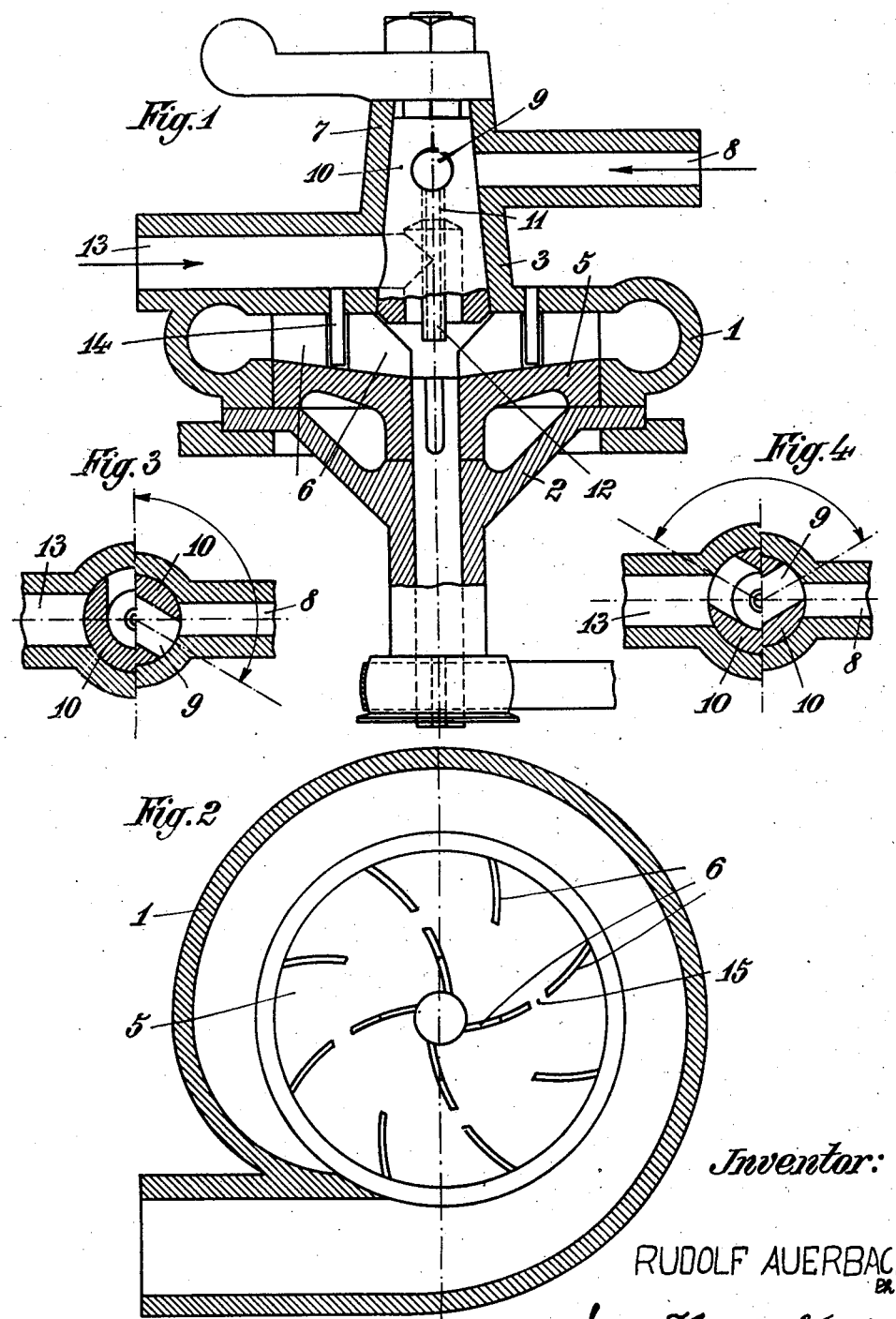

1,790,967

UNITED STATES PATENT OFFICE

RUDOLF AUERBACH, OF PROBSTDEUBEN, NEAR LEIPZIG, GERMANY

APPARATUS FOR PREPARING EMULSIONS

Application filed November 14, 1928, Serial No. 319,338, and in Germany November 14, 1927.

My invention relates to the treatment of liquid and semiliquid substances, that will not naturally mix together—such as oil or grease and water—but which are capable of being converted into so-called emulsions or suspensoids viz. preparations in which minute particles of a very fine dispersed, i. e. "emulsified" substance, are held in suspension in another substance, hereafter called "the emulsifying agent".

Emulsions, as used for technical purposes, e. g. in photography, in pharmacy, in tanning leather, dyeing furs and textile goods, producing oleomargarine etc., are usually prepared in a container or mixing drum into which the respective substances are put and are agitated therein until they appear to be thoroughly mixed. (See e. g. U. S. Patents 1,592,713, 1,293,087).

It is a fact well known to practitioners in this art that it is possible not only to emulsify one substance e. g. train oil in another substance—say water—but inversely water in train oil, and experience shows that—notwithstanding the fact that in both instances the proportions of the train oil and the water are exactly the same—the respective emulsions produced are of widely different character and appearance, showing strikingly different colors—e. g. in the case of oil emulsified in water the resulting emulsion is of white color, while water emulsified in oil yields an emulsion of a brownish color, different stability, and—last but not least—a different effect upon the articles to be treated.

A serious mishap often occurs in preparing emulsions in mixing machines as used heretofore: The character of the emulsion will change accidentally and unintentionally and for reasons unknown even to expert operators; it may happen that the whole quantity of the emulsion within the mixing machine—or a part thereof—will change its character, becomes useless for the intended purpose and must be discharged as a waste product.

In other words with the usual method of simply mixing liquid substances together for the production of emulsions it was uncertain—especially in the case of highly concentrated emulsions—whether or not an emulsion of the desired character was actually obtained.

Moreover in preparing emulsions in mixing machines, as used heretofore, the dispersion of the substance to be emulsified was of a rather primitive character viz. not as fine and uniform as it was essential for high class work: e. g., in dyeing furs spotted sections appear in the latter as the result of emulsion not having been of a truly homogeneous character.

The object of my invention is to provide an improved method by which highly concentrated emulsions of a finer and more stable quality can be produced than was possible heretofore.

Another object of the invention is to provide means by which truly homogeneous emulsions of a specific predetermined character can be produced with absolute certainty, thereby eliminating all risks and chances whether or not the emulsion obtained can be used for the respective purpose.

A further object of the invention is to provide an apparatus by which highly concentrated emulsions of a specific predetermined character can be produced in a continuous viz. more rapid and more economical manner than it was known heretofore amongst practitioners in this art.

The salient features of my invention are outlined in the accompanying claims and will be more easily understood from the following specification taken together with the drawing in which Fig. 1 is a cross section taken vertically through an apparatus—shown by way of an example—for producing emulsions of the character set forth;

Fig. 2 is a plan view showing the apparatus partly in horizontal section.

Figs. 3 and 4 are cross-sectional views showing the admission valve of the apparatus in different characteristic positions.

My method of continuously preparing emulsions consists in introducing the emulsifying agent as a continuous current into the central intake of a rapidly rotating centrifugal system and simultaneously introducing the substance to be emulsified into the very center of said centrifugal system.

In carrying out this method in practice, I have obtained good results by using a mixing apparatus resembling in its design a centrifugal pump and comprising a stationary outer casing 1, carried on a frame 2 and being formed with a tubular intake 3 and an outlet 4, a rotary impeller 5, having blades 6, and an admission valve 7 of special design.

The substance to be dispersed is introduced at 8 and passes through a passage 9 of cock 10 and from which a pipe 11, terminating in a nozzle 12 extends downwards, thus conveying the said liquid right into the very centre of the impeller 5.

The emulsifying agent enters through another passage 13 of cock 10 and passes through the intake 3 into the machine 5 in the form of a continuous current concentrically surrounding the pipe 11 and its nozzle 12 respectively.

On setting the impeller 5 into rapid rotating movement by a source of power (known per se) the emulsifying agent by reason of the generated centrifugal forces will pass towards the periphery of the impeller, while in the centre of the system a vortex or cyclone-like motion is produced by which the other substance issuing from the nozzle 12 is finely dispersed and rapidly distributed in the form of minute particles in all directions.

The emulsion which thus can be prepared with great economy of time and labor in a continuous manner is discharged at the outlet 4, and is ready for use without requiring further treatment, re-mixing etc.

Various changes and modifications may be made in the design, construction and assemblage of apparatus for preparing emulsions as described above, without substantially departing from the spirit and the salient features of my invention.

E. g. pins 14 may be provided at the upper part of the casing, said pins extending into recesses 15 between the impeller 5 and substantially promoting the dispersing and emulsifying effect.

The passages within cock 10 of the admission valve may be rectangularly shaped and be crosswisely arranged to each other, so as to cooperate with the respective intake passages of the valve housing in such wise that the proportion of the both—viz. the emulsifying and the emulsified—substances can be controlled simultaneously by one single turn of the cock.

Attention is further drawn to the fact that the emulsifying action is enhanced by supplying the substance to be emulsified in the form of a fine jet viz. through a nozzle of comparatively small diameter and by using—if required in special cases—a separate pump in order to force the said substance into the machine and thus to overcome the resistance caused by the sticky and viscous nature of the substance to be emulsified and by the small cross sectional area of the nozzle 12 respectively.

What I claim is:

1. Machine for continuously preparing emulsions comprising in combination a centrifugal pump, having a centrally arranged intake and means for conveying simultaneously the emulsifying agent and the substance to be emulsified to the centre of said intake in the form of two co-axially arranged currents surrounding one another,—said means comprising a cock provided at the intake of the pump and being adapted to simultaneously control the admission of two substances, the revolvable element of said cock having two longitudinally arranged passages, concentrically surrounding one another, and radial passages communicating with the former and with feeding pipes conveying the substances under treatment.

2. Machine for continuously preparing emulsions comprising in combination a centrifugal pump, having a centrally arranged intake and means for conveying simultaneously the emulsifying agent and the substance to be emulsified to the centre of said intake in the form of two co-axially arranged currents surrounding one another,—said means comprising a cock provided at the intake of the pump and being adapted to simultaneously control the admission of two substances, the revolvable element of said cock having two longitudinally arranged passages, concentrically surrounding one another, and radial passages communicating with the former and with feeding pipes conveying the substances under treatment, the said radial passages being arranged in rectangular position to each other while the feeding pipes are attached to the stationary element of the cock in opposed position to each other.

In testimony whereof I have signed my name to this specification.

RUDOLF AUERBACH, Ph. D.